July 11, 1944. S. P. MILLER 2,353,486
AUTOMATIC CONTROL FOR HEAT TRANSFER SYSTEMS
Filed Sept. 4, 1941 4 Sheets-Sheet 1
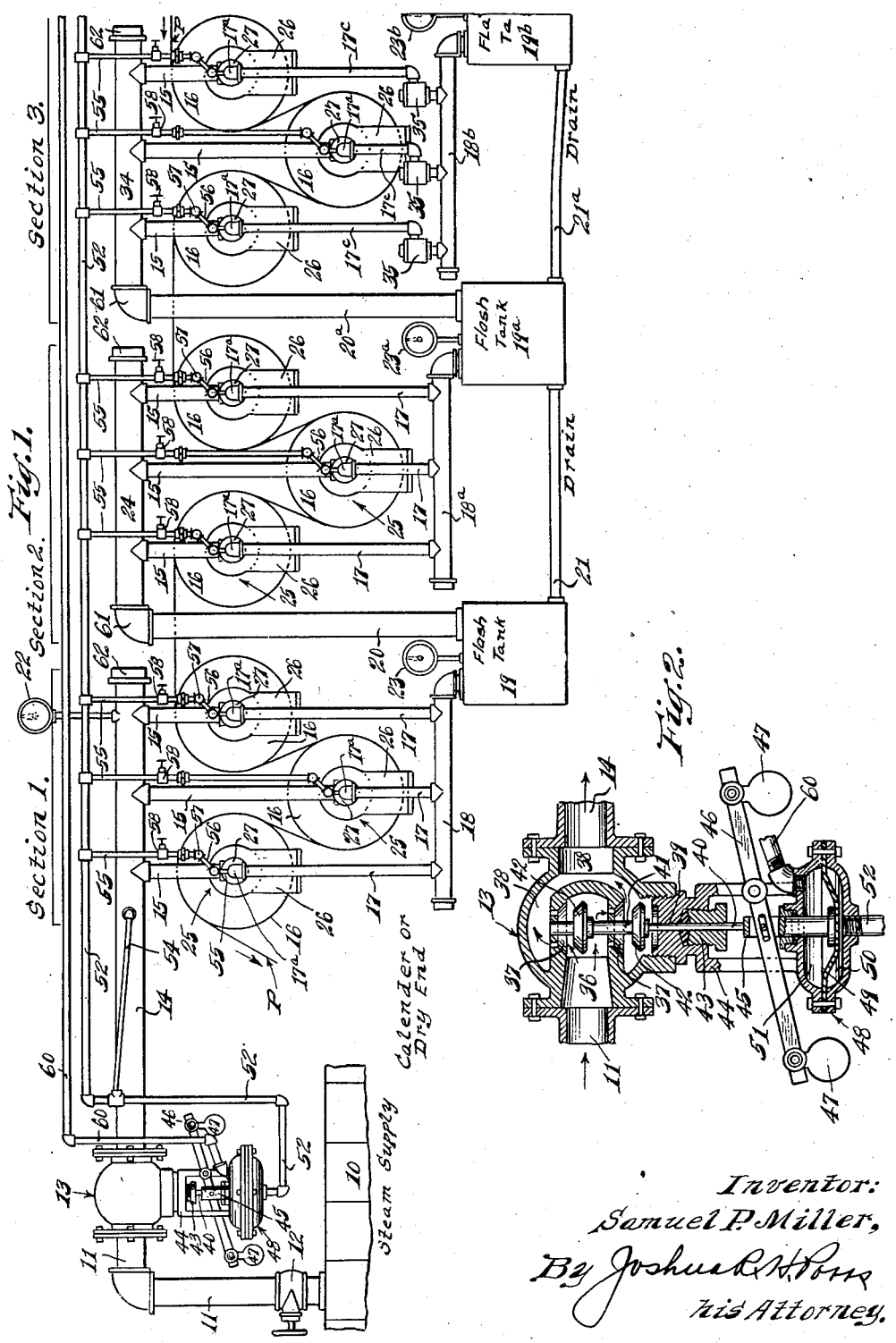
Inventor:
Samuel P. Miller,
By Joshua R H Potts
his Attorney.

July 11, 1944.   S. P. MILLER   2,353,486
AUTOMATIC CONTROL FOR HEAT TRANSFER SYSTEMS
Filed Sept. 4, 1941   4 Sheets-Sheet 2
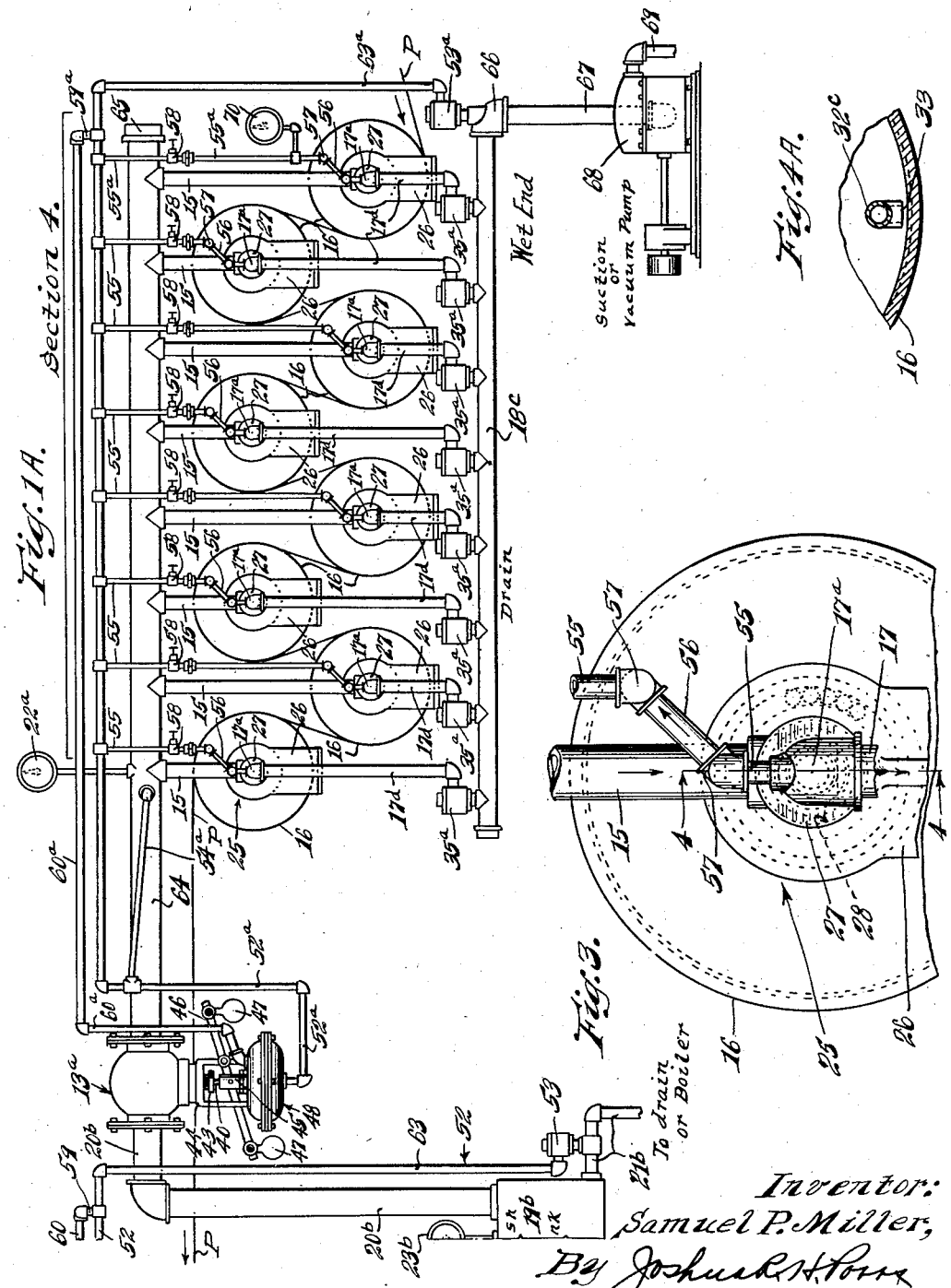

July 11, 1944. S. P. MILLER 2,353,486
AUTOMATIC CONTROL FOR HEAT TRANSFER SYSTEMS
Filed Sept. 4, 1941 4 Sheets-Sheet 3
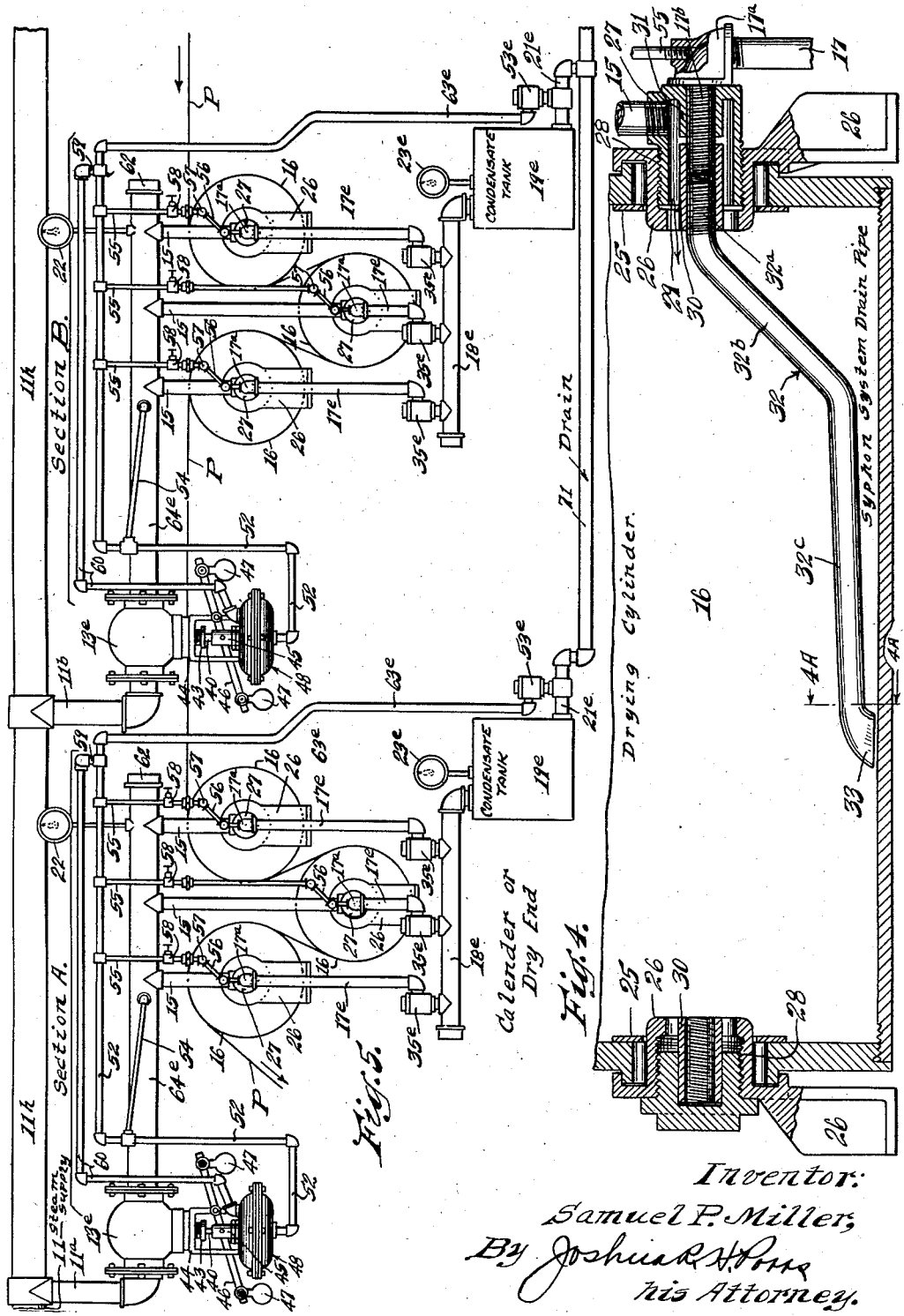
Inventor:
Samuel P. Miller,
By Joshua R. H. Potts
his Attorney.

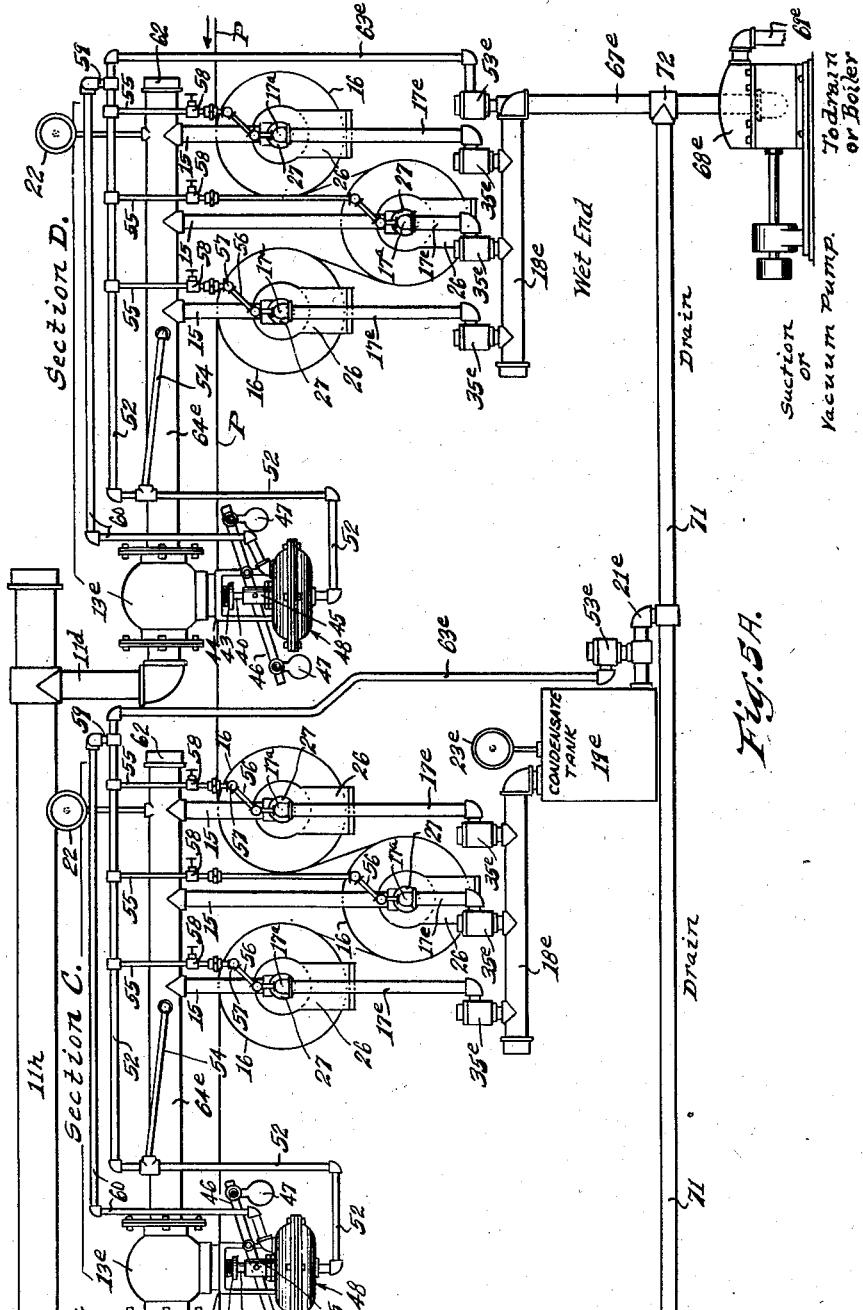

Patented July 11, 1944

2,353,486

UNITED STATES PATENT OFFICE 2,353,486

AUTOMATIC CONTROL FOR HEAT TRANSFER SYSTEMS

Samuel P. Miller, Chicago, Ill.

Application September 4, 1941, Serial No. 409,460

12 Claims. (Cl. 237—9)

My invention relates to heat transfer systems, and more particularly, to self-regulated heat transfer systems or automatic control means for steam heating and drying systems or for other desired uses or purposes. While the invention will be shown and described in connection with a system for drying paper of various grades and content, textiles and the like, it is to be understood that my steam heating and condensation system is adapted for use in connection with any desired heating or drying unit or units the sections of which may be arranged for simultaneous or independent control and regulation in any desired arrangement.

Another object of the invention is to provide a heat transfer system automatically controlled or regulated within itself without human intervention and in which the pressure or degree of vacuum throughout the entire system may be maintained at a substantially uniform and predetermined point constantly and at all times or at different pressures at different points in the various sections or units according to the purposes of the system and the work to be performed and in which the pressure and temperature may be maintained accurately at any desired high or low point or at any intermediate point therebetween, either uniform and predetermined throughout the entire system or at different pressures and temperatures at different points or in the various transfer units or sections of the system.

Another object of the invention is to provide a heat transfer system or automatic control or regulating means for steam heating and drying systems having one or more transfer units, which may be produced at a very small cost and one which may be employed with known heat transfer systems without occasioning expensive changes and in which the pressure in the auxiliary or secondary steam line, in the units or at other locations may be maintained at a very low point, even below atmospheric pressure, as well as at any other desired pressure above atmospheric, and yet provides sufficient heat for the transfer system or according to the use to which the system is put.

Another object of the invention is to provide a novel, simple and accurate heat transfer system and self-regulating or automatic control means therefor by which the temperature or temperatures at various points or in various parts or units of the system may be maintained constantly at any desired or required pressure and temperature or heat according to and depending upon the conditions and results to be obtained, and automatically or self-regulated, that is, without human or manual intervention.

In heat transfer systems as heretofore employed, proper regulation of the temperature has been very difficult, if not impossible, and required constant attention and manual manipulation in order to maintain the temperature on the various units constant or at the desired or necessary pressure and temperature, especially where the demand on the system or units at various points varies from various conditions.

It is therefore an important object of the present invention to provide a simple and novel automatic or self-regulation or control of heat transfer systems used for heating and drying or otherwise, which can be constructed into the system initially or applied to known systems at comparatively low expense and which will effectually, when set or adjusted, accurately and dependably regulate and control the entire system or the various transfer units thereof at different temperatures and pressures at various points so that when once set, it will stay set and continue to operate at the desired pressure and temperature and insure complete and free circulation, as well as eliminating pockets or walls of water or condensed moisture and air or gases, especially non-condensable gases which are lighter than expanded steam and which, therefore, go to the top of the transfer units and the dew or condensate formed of expanded steam which goes to the bottom of the various pipe lines or units and keeps the various thermostatic traps shut off and circulation impeded or stopped due to the heat contained and the gases thus are not removable by the ordinary vacuum pump. In other words, in accordance with the present invention and system, or self-regulating and automatic control means, continuous, free and unimpeded circulation and accurate regulation is assured.

The present invention relates further to an improvement upon said system where the control includes a return line connected to the opposite side of the control or reducing valve and diaphragm chamber so that the regulation or effect due to slight changes in pressure and temperature upon being set for a certain differential, is not only more sensitive, but more accurate and quicker whether controlling a plurality of units or each individual unit independently or separately. Thus, in high pressure heat transfer systems such as employed in heating or in drying machines, the exhaust steam from one unit may be carried to the next unit after the condensate is removed therefrom, by employment of a flash tank in which the condensate and vapor are heated to generate and maintain the steam pressure in succeeding units by employing the latent heat in the steam for evaporating the water in the web or in heating the various succeeding transfer units.

In some heating or heat transfer systems, the steam is supplied to one unit and then, after doing its work by heat transfer such as in heating or drying apparatus, the steam is supplied to the next unit or section and so on through successive units until the last one is heated, while in other systems, each unit receives its supply of heat directly from the main or live steam supply or a secondary fed thereby and the present automatic or self-regulated control means is applicable to either system and operates not by means of a separate water pressure pipe or by direct connection to the main or secondary steam supply, manifold pipes or headers alone, but from the far or low pressure side of the system either at the units or a drain or outlet thereof under low, suction or vacuum pressure which may be 10 or 12 inches of vacuum in a vacuum or low pressure system and correspondingly higher in a high pressure system. The gas equalizing or control lines for automatic regulation of the heating of the units forms a loop or continuous circuit which is connected at its ends to opposite chambers of the control valve diaphragm or piston instead of to only one side and thereby becomes more sensitive and extremely accurate in maintaining the steam pressure at a predetermined point for each or all units and constant according to the adjustment or differential for which it is set, thus insuring uniform heating and results. In the type of heat transfer systems known as vacuum or low pressure systems, exhaust steam from a power generating engine is employed to supply heating systems or other heat transfer systems. In such systems, the primary steam line from the boiler or other source of steam is provided with a by-pass, one side of which supplies steam to a power generating engine under boiler pressure and the other side supplies steam under the same pressure to a reducing or regulating valve which, in turn, communicates with and supplies steam to the main secondary steam line. The exhaust steam from the power generating engine is received in a tank also communicating with the main secondary steam line and a vacuum is preferably maintained therein and exhaust steam receiving tank in order to increase the efficiency of the power generating engine and the heat transfer system. Under such systems, steam may be delivered from the boiler to the heat transfer system at as much as 10 inches of vacuum, if desired, and this vacuum may be maintained at a constant degree by the automatic opening and closing of the regulating or reducing valve interposed between the primary from the boiler and the main secondary steam line. While such a result is highly desirable and increases the efficiency of the power generating engine and heating system, it is not adaptable to high pressure heating or heat transfer systems such as used for heating and drying purposes and particularly where the steam used or condensed in the system is at a very high percentage and the present invention renders the system adaptable for both uses. In other words, the present invention is equally applicable to low pressure or vacuum systems as well as to high pressure heating, drying or heat transfer systems, as before pointed out, and results in a more sensitive control or automatic regulation and maintenance of a uniform pressure and temperature in each of a series or plurality of transfer units of a system where simultaneously or independently controlled units are employed by positioning and connecting a reducing and control valve for a plurality of units or between each pair or one unit and its succeeding unit, which is especially adapted for drying soft or tissue papers, or in other combinations thereof such as between a plurality of units at the calender, dry or discharge end and a single unit or one or more units at the wet, entering or feed end. This is due to the low pressure regulating or control lines being connected to the steam supply control or regulating and reducing valve for supplying additional or live steam to the system, on opposite sides of the diaphragm or piston thereof, connected to actuate the valve at the opposite pressure chambers thereof instead of to one side only thereof, thus also allowing a suction or vacuum pump to be employed to quickly exhaust or withdraw water, air and insoluble or non-condensable gases from the entire system and rendering the same and the valve quickly responsive to slight pressure and temperature changes to supply live or fresh steam to the system at the high pressure and temperature side to maintain the heating uniform throughout or at the various independent or individual units, series of units or drying rolls or cylinders, or each cylinder, constant according to the pressure and temperature for which they are set, either high, or low or vacuum pressure, and keeping the differential between adjacent or succeeding heating units or cylinders constant at all times without any manual effort or intervention. This reducing valve may be set to taper the pressure and temperature in the entire set of rolls or cylinders, say from 30 to 10 pounds or even to a minus or 10 inches vacuum pressure, or any other differential wanted, and the gas control or equalizing lines will quickly equalize each individual roll and keep the rolls from air or gas binding, as well as stop the individual rolls from creating a vacuum or going to a lower pressure due to rapid condensation of the steam while, at the same time, only employing very small pipes of one-half and one-quarter inch diameter or substantially so, which can be quickly and economically installed and connected to known systems. The return from the rolls may be trapped or not as the case may be, and a steady or fixed differential allows a steady flow of steam to each roll with exact temperatures provided for and causing a more even and uniform drying of the paper where employed for such purposes. The equalizing control lines vent each roll separately allowing non-condensable gases to flow up from each roll or cylinder and pass or be carried off and the condensate flow down from each roll for drain or return to the steam generating system or boiler. In this way, the heating or drying units are properly regulated whether connected to a steam supply line directly or directly controlled or indirectly thereof or indirectly controlled to different regulators and whether the steam is caused to successively pass through said units to maintain the steam at different temperatures or pressures in the different units or series of units as where the used steam from one unit passes to the next leaving a region of higher pressure and enters one of lower pressure so that whatever condensate remains is partly or largely converted into steam at the desired temperature or passes directly to the different units independently of each other from the main or secondary steam supplies as live steam for heat transfer, absorption, condensation and discharge.

Another object of the invention is to provide a novel arrangement and construction of siphon of a siphon system for discharging and draining the waste water of condensation and condensed steam from within the drying cylinders as used in drying machines through the trunnions on which the cylinders revolve or are driven, said condensate being condensed from the steam used in heating the transfer units or cylinders.

Other objects and advantages will appear and be brought out more fully in the following specification, reference being had to the accompanying drawings, in which:

Figs. 1 and 1A are a diagrammatic side elevation of a portion of a paper making machine, showing the drying rollers or cylinders equipped with my automatic control system;

Fig. 2 is an enlarged vertical sectional view of a control or regulating and reducing valve employed in connection with my control system;

Fig. 3 is an enlarged fragmentary end elevation of one roller, with the steam supply, drain and regulating connections thereto;

Fig. 4 is a section taken on the plane of the line 4—4 of Fig. 3, and showing also the lower portion of the roller or cylinder;

Fig. 4A is a section taken on line 4A—4A of Fig. 4; and

Figs. 5 and 5A is a diagrammatic side elevation corresponding to Figs. 1 and 1A, of a modified form of the control system.

Referring to the drawings, in which I have illustrated two different embodiments of the invention, and particularly to the form shown in Figs. 1 to 4A, inclusive, 10 indicates a steam generator or supply shown as a conventional type of boiler which is employed to deliver steam at any suitable pressure to a primary steam supply pipe or line 11, and 12 designates a boiler shut-off valve adjacent thereto. 13 is an automatically controlled regulating or reducing valve, the high pressure side of which is connected to the primary steam line 11 and controls the discharge of steam at its low pressure side into a main secondary steam distribution pipe or line 14 forming a manifold or header of a plurality of units or sections designated as Section 1, Section 2, Section 3 and Section 4, the first being at the calender or hot dry end and the last at the wet or entering end, also designated as the receiving end for the wet pulp web from the paper making machine such as an ordinary Fourdrinier machine and the dry end being the discharge end for the finished product, the paper P passing around the various rolls or cylinders of the drying machine, part or apparatus and any desired number of rollers or cylinders being employed in each unit or section, as desired, or as is customary and common in the art. For convenience, three of such cylinders are shown in Sections 1, 2 and 3 and 8 cylinders are shown in Section 4 by way of illustration, but the number usually employed generally varies from 5 to 8, or otherwise, as desired. The illustration of three cylinders in the first three sections or units is merely for the purpose of illustration and to condense the drawings or showing instead of extending the same as in Section 4. Extending from the main secondary supply line or header 14 are a plurality of branch steam supply lines or pipes 15, which branch or auxiliary lines may be of any suitable size, but are shown smaller. The branch pipes 15 lead into the trunnions of the various rollers or cylinders 16 of the different sections or units of which Section 1 is illustrative. This steam is supplied around outlets or drains 17 for used steam or water of condensation from which the water is discharged or drained into a return main or header pipe 18 located below, although I wish to have it understood that I do not desire to be restricted to the employment of this specific arrangement with the supply lines at the top instead of at the bottom. The return discharge or drain pipe 18 extends into the top of a flash tank 19 into which the previously used steam along with the vapor and condensate which is subjected to the action of the steam to generate additional steam or cause the same to flash or pass into the steam outlet 20 leading from the top of the tank and to the next unit or section. A drain 21 for water extends from the bottom of the flash tank 19 to carry off waste water or condensate. A gauge 22 is provided on the secondary line 14 at any suitable point such as at the far end to indicate the pressure of the steam therein and a gauge 23 for similar purposes may be provided upon the flash tank 19. Continuing from Section or Unit 1 to Section 2, it will be noted that the latter is of substantially the same construction and arrangement, including a manifold, header or secondary steam supply line 24 also extending horizontally and in this instance, from the top of the steam outlet 20 instead of from the main supply 11 and the valve 13 as is the main secondary supply line 14. Otherwise, the construction of the subsequent Sections 2 and 3 is the same as Section 1 and the line 24 may be provided with a similar gauge while the flash tank 19a is provided with a gauge 23a. In this instance, the return main or header drain pipe is designated at 18a and the flash tank 19a has a steam outlet 20a and a drain pipe 21a, in addition to the gauge 23a.

Each of the cylinders has a trunnion or roller bearing 25 on which the ends of the cylinders rotate and have support, the cylinders being driven to revolve at any suitable speed and in any desired way as is common in the art. The bearings are designated at 26 and are in the form of a stationary frame which may form the sides of the drying machine or individual bearings therein in which are pipe fittings 27 or suitable nipples connected or threaded as shown at 28 and having passages 29 for the entrance of the steam. Suitable connections are made with the outlets or drains 17 of a siphon system which may include a tube or bushing 30 carried by, and attached to, or forming a part of the bearing 26 which are shown tubular and extending from the inner end thereof axially of the trunnion in alignment with an outer tube 31 forming a part of the fitting 27 and receiving the drain pipe 17 through the medium of elbows 17a and nipples 17b as shown more particularly in Fig. 4 of the drawings. A siphon pipe 32 is threaded at 32a in the tube 30 separate from the nipple 17b and this siphon pipe has an inclined outer portion 32b and is then bent at an obtuse angle toward its inner portion 32c which is inclined or slightly divergent from the cylindrical wall of the cylinder so as to incline at a slight angle with an enlarged inlet end 33 of convex curvature corresponding to the curvature of and spaced from said cylindrical wall as seen in Fig. 4A in the shape of a funnel or flared end permitting free outlet of the condensate. All of the cylinders are so equipped to provide a siphon system of drains for the cylinders.

The steam outlet 20a leads into a branch manifold or auxiliary steam line 34 constituting the manifold or header of Section 3, the same as the steam outlet 20 leads into the auxiliary steam line 24 of Section 2 to convey the exhaust and flash steam from Section 1. However, in Section 3, the drain pipes are denoted 17c corresponding to the drain pipes 17 of Sections 1 and 2 in which automatic steam traps 35 are interposed in the form of trap valves which allow the water to be discharged without apparent loss or passage of steam into the return drain pipe or header 18b which empties into the flash tank 19b provided with a similar steam outlet 20b corresponding to the risers or outlets 20 and 20a. The flash tank for condensate is provided with a drain 21b which may lead to a discharge or return to the boiler. A similar gauge 23b may be provided upon the flash tank 19b.

The automatic regulating or reducing valve 13 controlling the supply of steam to one or more units or sections and cylinders thereof or other heat transfering elements or units is preferably constructed as shown in Fig. 2 of the drawings in which the high pressure side connected to the primary steam line 11 has an inlet or inner chamber 36 within the casing of the valve 13 and has a pair of valve seats 37 through which the steam passes and an outer or outlet chamber 38 on the opposite side of the internal wall provided with the seats 37 at the low pressure side leading to the main secondary steam line or header 14. A packing gland is connected to the valve casing as by threading the same into the lower open portion thereof through which access is obtained to the interior structure and this gland has a small bore 39 in which a stem 40 reciprocates, the stem having an enlarged upper end portion 41 provided with a pair of valves or valve heads 42 to cooperate with the seats 37 in the valve structure body. In the gland or attaching portion which receives the stem 39 is a packing gland 43 sealing around the stem and closing off the escape of steam within a frame or hanger 44 suspended from the casing. The enlarged lower portion of the stem carries or is formed with an upright post 45 which is operatively connected to a balance lever 46 pivoted in the frame 44 at one side and having adjustable weights 47 on the arms thereof adapted to be set for any desired pressure operation according to the differential established or desired to be maintained as well as the pressure of the steam and degree of heat to be sustained in the transfer units or cylinders connected to the valve. This post 45 operates through a diaphragm casing of a pressure control means 48 which may be diaphragm or piston controlled. In the present instance, the post 45 is shown connected to a diaphragm 49 in the casing 48, forming a lower pressure compartment or chamber 50 and an upper pressure compartment or chamber 51, the former of which is connected to a control pipe 52 forming part of the control or pressure equalizing system and which, in this instance, is of small diameter, preferably about one-half inch, shown extending upwardly and along the secondary supply pipe 14. The pipe 52 may be arranged at any suitable level instead of below the secondary 14 and may be in line therewith or above the same, to which point it is extended as shown in Fig. 1. This pipe 52 is connected to the relatively high pressure or supply side or near end of the secondary 14 of the section or unit 1, but is connected to the low pressure side or far end at the drain pipe 21b by a down pipe 63 with an interposed automatic trap valve or thermostatic steam trap 53. At the near end or high pressure side, the pipe 52 is connected by a smaller pipe 54, preferably about one-quarter inch in diameter, to the secondary line 14 at any suitable point along its length and preferably disposed in an inclined position away from the pipe 52 to the line 14 to drain and subject the control line to the pressure therein but preferably adjacent the branch pipes 15. Branch control lines 55 are preferably tapped into the pipe 52 along and above the secondary line 14 in each of the respective units or sections and depend therefrom for connection with the respective cylinders at their outlets 17 at the discharge sides or ends of the rolls 16 by connection with the elbows 17a as seen in Figs. 3 and 4. These upright downwardly extending pipes 55 are also preferably of smaller diameter than the pipe 52 or about one-quarter inch in diameter and constitute leads therefrom to the respective heat transfer elements or units such as the cylinders or rollers 16. Loose or swing joints 56 are preferably provided in the connections 55 inclined as shown more particularly in Figs. 1 and 3 to have vertical movements to compensate and allow for expansion and contraction of the connections and the relative movements between the various parts of the heating or drying system and pipes constituting the same in connection with the cylinders. The control lines or pipes 55 may be provided with valves 58 so that each heat consuming unit, roll or cylinder 16 may be individually controlled or cut off for purposes of replacement or repair or any adjustment that may be needed. At the far or low pressure side or end of the equalizer or control line or pipe 52 a connection 59 is made to a return control or equalizer line or pipe 60 which is preferably of corresponding gauge or size, that is, one-half inch diameter and this pipe 60 extends or returns to the control or operating means 48 of the reducing or feed valve 13 to form a closed circuit or loop in the control line and is connected to the upper preferably closed or sealed chamber or compartment 51 of the diaphragm casing or pressure control means 48 for actuating the valve 13 as shown more particularly in Figs. 1 and 2 of the drawings.

The flash or exhaust steam from the tank or condensation chamber 19b is discharged through the outlet 20b, the steam having been successively reduced in pressure and heat in each succeeding section or unit so that whereas there may be a 30 pound pressure in Section 1, this may be 20 pounds in Section 2 and 10 pounds in Section 3 or any other differential wanted, or, if the pressure is lower in Section 1, it may be reduced to a minus or vacuum pressure when it reaches Section 4 at the discharge or outlet pipe or riser 20b, or, at this point, the pressure may be 5 pounds, more or less. This steam is discharged into a control or reducing valve 13a corresponding to the valve 13 and having a similar diaphragm or pressure control adjustable by the weights 47 to a minute degree so that the operation will be as sensitive as desired in effecting the supply of steam to the Section 4 or in cutting off the same when the various heat transfer units or cylinders have been equalized. It should be noted that instead of controlling a plurality of units as does the valve 13, the valve 13a controls a single unit, but I wish to have it understood that, in my system, the reducing valve of the primary line may be placed in multiple series with the entire load or the near and far ends of the secondary line may be placed in series by means of the control or equalizing by-pass lines 52, 60 and 63 to allow an equalizing of pressure between the near and far ends of the secondary line to be registered on the control or by-pass line in addition to having separate pressures and a predetermined differential between each of the units controlled by a common equalizing or by-pass line and structure as well as independently controlling a single or each individual unit or section so that the diaphragm in the reducing valve of the primary line being in communication with the control or by-pass line, the pressure on the diaphragm will vary according to the rate of condensation in the heat transfer units or cylinders and the condensing units. Thus, exhaust steam may be used below or above atmospheric pressure for heating systems or at sub-atmospheric pressure in such systems or other heat transfer units where the condensation is low or very rapid. In low or vacuum pressure systems, there will be an efficient and economical heat and reducing of back pressure on the engine generating the exhaust steam and at the suction or vacuum pump and the initial steam may be reduced from 35 pounds to 19 pounds or less per hour per horsepower at definite inches of vacuum and the arrangement entirely eliminates all of the disadvantages of the necessity of using water for condensation in cases where exhaust steam is used for heating or process work at above atmospheric pressure.

In section or unit 4, the cylinders 16 are the same as previously described, and, in this instance, I have illustrated 8 of such cylinders around which the paper P passes instead of three or more cylinders, as described in connection with the previous sections, but it is to be understood that any number may be employed as found practicable. In connection with the secondary pipes or headers 14, 24 and 34, the risers 20 and 20a may be connected to the horizontal headers by elbows 61, the same as in connection with the pipe or riser 20b and its horizontal connection with the valve 13a and the ends of the headers or manifolds 14, 24 and 34 may be closed by end caps or plugs 62 after the last heat transfer unit or cylinder. Whereas the high pressure side of the valve 13a is connected to the pipe 20b forming an outlet from the flash tank or condensation chamber 19b, the low pressure side or outlet is connected to another secondary header or manifold pipe 64, which, in addition to being independently controlled, is, like the secondary manifolds 14, 24 and 34, auxiliary or subsidiary to the primary or main steam line 11 and the manifold 64 is provided with an end cap or plug 65 together with the corresponding branch steam supply pipes 15 leading to the cylinders 16 and the other connections and structure, the same as previously described in connection with Figs. 1, 3, 4 and 4A, but, in this instance, the outlets or drains are indicated at 17d leading into the common bottom return pipe, drain or outlet manifold 18c and discharging through an elbow 66, which may be similar to the elbows 17a, into a discharge pipe 67 connected to a vacuum or suction pump 68 which may be either the rotary or reciprocating type, from which a pipe 69 leads to return to the boiler or steam supply or to a generating engine or exhaust, or to a drain or hot well. A gauge 22a may be provided upon the manifold pipe 64 corresponding to the gauge 22 and thermostatic traps 35a may be interposed in the drain pipes 17d the same as the traps 35 in the drain pipes 17c for similar function or action. The control or equalizing lines of reduced diameter, as heretofore specified, include a pipe 52a corresponding to the pipe 52 and connected to the lower pressure compartment or chamber 50 of the diaphragm or piston casing 48 thereof controlling the valve 13a, and extending above the manifold 64 with a down or upright return pipe 63a connected to the elbow 66 at the far end or low pressure side, as of the drain 18c with an interposed thermostatic trap valve 53a corresponding to the thermostatic valve or trap 53. A gauge 70 may be provided on any of the depending branch control lines 55a corresponding to the tapped control lines 55 but is shown on the last one at the far end of the section or unit 4 to obtain the pressure at this point. The gauges may be used for inspection so that if any correction, readjustment, replacement or repair is needed, it may be quickly effected though, usually, this will not be necessary. The return of the loop or circuit of the equalizer or control line is made through the pipe 60a which has connection at 59a to the pipe 52a at the far end of the latter and the pipe 60a is connected at its near end to the upper pressure compartment or chamber 51 of the diaphragm or piston casing 48 of the valve 13a, the same as the pipe 60 previously described in connection with the valve 13.

In the operation of the system as described and with the valve 12 open the desired degree, steam from the supply source is admitted into the primary line 11 to pass into the inlet chamber 36 of the valve 13. Previously, this valve is adjusted by moving the weights 47 along the lever 46 at the ends of the arms thereof to establish a predetermined pressure difference or differential between the first and last or successive units of the different sections of the heat transfer or drying system, which may be radiators or otherwise, and shown, in this instance, as cylinders having a high or low percentage of condensation or absorption depending upon the particular application and use of the system. The valves 42 being unseated to permit the steam at the required pressure to enter the secondary line 14, pass through pipes 15 into the cylinders 16, while some of this steam is by-passed, that is, part thereof passes into the small control pipe 54 to the pipe 52 from whence it passes into the chamber 50 of the control device 48 and pushes upwardly on the diaphragm 49 together with the post 45 and stem 40 tending to or to set the valves 42 against their seats 37. This steam also passes into the various pipes 55, 60 and 63 of the control lines and the valves 58 being open, passes from the cylinders 16 through the swing joints 56 at the elbows or fittings 17a to pipe 52, the steam from the secondary 14 having previously passed into the cylinders through the branch pipes 15 by their connection with the cylinders at the passages 29. In this case, there is no direct connection from the secondary 14 or secondaries 24 and 34 to the upper pressure chamber 51, and consequently the steam in the pipe 52 will follow the line of least resistance, and since it cannot pass the trap 53 into the drain 21b from the flash tanks or condensation collecting chambers, it will pass into the pipe 60, tending to establish an equilibrium or equalize the pressure therein and consequently will pass into the upper chamber 51 therefrom but at such pressure as not to prevent seating of the valves 42, although normally the pressure in the lower chamber 50 on the lower face of the diaphragm 49 will tend to force it upwardly and thus decrease the opening of the valves 42 controlling the admission of steam from the primary 11 to the secondary 14 to reduce or cut off the same when the pressure in the line 52 exceeds a certain point to establish a differential or tends to equalize with the pressure in the remaining control lines 60 and vice versa or, when in some cases, at a low, minus or vacuum pressure. The machine being operated, the percentage of condensation and absorption in the cylinders in heating and drying the paper is quite high, and this condensate with a variance or differential of 2 pounds or 2 inches of vacuum pressure between the branch inlets 15 and the outlets 17 will lift or siphon the water of condensation from the cylinders 16 so that the condensate will pass out through the siphoning pipes 32 and be discharged through the outlet pipes 17 and drain manifold 18 to the flash tank or condensate chamber 19 as the cylinders revolve in contact with the paper P under tension. The exhaust or used steam passing into the tank 19 will heat the water and vapor in the tank causing additional steam to be generated at a lower pressure than originally supplied and passed therewith into the outlet or riser 20 to the manifold or header 24 constituting the secondary of the next unit or Section 2 and the same operation will be repeated in this section with drain through the outlets 17, return 18a and flash tank 19a while the water also drains through the pipes 21 and 21a to successive tanks for discharge at 21b to drain or to return to the boiler. However, the pressure in the second section or unit will be lower so that it will operate at a lower temperature and this will be successively reduced in Section 3 at a still lower pressure and temperature, but whereas the drain through the pipes 17, 18 and 18a will be unimpeded so as to permit the used steam to exhaust therewith and pass into the manifolds 24 and 34, the latter through the outlet 20a from the flash tank 19a, the steam from the cylinders 16 of section or unit 3, each made up of a plurality of transfer units or cylinders such as indicated at 16, will be trapped or prevented from passing through the outlets 17c by the thermostatic traps or trap valves 35 since these traps will permit water to pass at a low temperature but will not permit steam to pass, nor will it occasion any apparent loss in the steam pressure and will close under a certain temperature for which set under the action of the steam in the outlets 17c, such steam will pass out through the outlet or riser 20b to the valve 13a to be supplied to the manifold 64 of Section 4 and corresponding elements and pipes thereof in the same manner as in connection with Sections 1, 2, and 3, but at a lower pressure and temperature at the feed or wet end of the machine where the web of paper enters onto the rollers 16. As the paper or pulp web P is fed in at the wet end, which is at the lowest temperature, it will be subjected successively to higher temperatures in the succeeding sections progressively toward the calendar or dry end where the finished paper is discharged and in this form, any number of sections may be simultaneously controlled but depend on the travel and exhaust of steam or vapor from one section to the other to establish a differential between different sections from the highest to the lowest of the sections jointly controlled by a single control means but directly controlled by the latter. When the temperature and pressure is such in the pipes 52 or 52a and lower chambers 50 or higher than in the pipes 60 or 60a and upper chamber 51 according to the setting of the weights 47 of the levers 46 of the control device 48, as to raise or push the diaphragm 49 upwardly, the valves 42 will be closed and the supply of steam cut off, this being normally caused by the direct connection of the line 52 with the secondary 14 at the pipe 54 which, as before stated, is preferably inclined to drain all moisture therefrom and avoid obstruction by water or gas. Whether operating at vacuum or higher pressure and as applied to steam or heat transfer or consuming units in the form of cylinders or otherwise, should the pressure in any secondary 14, 24 or 34 or in any of the cylinders 16 and lines 55 fall below a certain point at which the device is set to operate, this will immediately lower the pressure in the pipe 52 to permit the diaphragm 49 to move down as shown in Fig. 2 and open the valves 42 to admit steam to the secondary 14 and the entire system as previously described due to the unbalancing of the lever 46 from its adjusted position after being equalized and due to the steam following the line of least resistance or entering the pipe having the smallest pressure therein and continuing to do so until the pressures are equal. Since the pressures in the pipes 52 and 60 and chambers 50 and 51 are sufficiently great, the valves 42 will remain closed depending upon the adjustment of the weights 47, sufficient to raise the piston or diaphragm 49 to close valves 42. This action will take place in any one of the secondaries or in any cylinder so that each set or cylinder or each unit will actuate the control mechanism to admit steam for simultaneous or individual control so that the entire system will be readjusted or operate to maintain a certain predetermined adjustment or differential for which it is set. By having the control or by-pass lines connected to both sides of the diaphragm which actuates the control or reducing valve by control lines 52 or 52a to the pipes 54 or 54a with the near end of a secondary such as 14 or 64, and to the cylinders 16 at the pipes 55 at the low pressure sides or exhaust outlets 17, 17c and 17d and to the return control lines or pipes 60 or 60a, the regulation becomes more sensitive, quicker and more accurate and is especially adapted for paper making machines but will operate in connection with other heat transfer systems using cylinders, radiators, or otherwise. The reducing valves 13 or 13a may be set to operate at any desired pressure or to close or open on a balanced or an unbalanced pressure at opposite sides of the diaphragm, depending upon the adjustment thereof by the weights 47 and in low pressure or vacuum systems may be set at 10 inches of vacuum and the vacuum pump may be set to maintain a vacuum of 12 inches which gives a differential of 2 inches for causing circulation or discharge of condensate or water. This will allow a temperature of steam in the control or by-pass lines 52 and 60 to be maintained at the temperature of steam at 10 inches of vacuum, and when the thermostatic trap 53 or the traps 35 start to open at this temperature or pressure, this will allow 12 inches of vacuum in the return lines to pass to the control or by-pass line and lower the pressure in the secondary line as well as under and at both sides of the diaphragm depending on the adjustment of the weights 47 of the reducing valve structure 13, thus causing the valves 42 to open to admit more steam to the system until the temperatures and pressures in the control lines have reached the set temperature and pressure at which the device and system is adjusted to operate, when the system and thermostatic traps 35 and 53 or 35a and 53a will be closed, cutting off the vacuum pump from the control or by-pass lines 52 or 52a, 60 or 60a. The thermostatic traps will be balanced to maintain the degrees of heat throughout the heating system at the temperature of steam at which the reducing valve is set, but, this temperature and pressure will be affected by the condensation and absorption in each unit, section or set of cylinders, as well as in each individual cylinder constituting one form of steam or heat transfer or consuming unit so that the entire transfer system will be affected to effectually maintain the desired temperature and pressure throughout, at and from any point in the system. This will also affect the operation of Section 4 by controlling the exhaust or flash steam entering the pipe 20b and the thermostatic valves 35 and 53 will maintain the temperatures in Section 3 and the preceding Sections 1 and 2, while maintained at successively higher temperatures and pressures, receive and dry the paper web in a reverse order insofar as the volume of moisture therein is concerned. Section 4, however, will be independently controlled at the valve 13a in the same manner at any point in the system by a drop in pressure and temperature or by the opening of any of the steam traps 35a or the trap 53a which is particularly affected by the action of the exhaust or suction pump 68 at the desired differential or pressure lower than in the control line whether at a minus pressure or vacuum, or a high or positive pressure. Thus, the control or reducing valves 13 and 13a are normally closed to cut off the supply of steam and no opening thereof will occur until the equalization of pressure occurs in the control lines or sufficient pressure to overbalance the action of the weights so as to depress the diaphragm 49 and unseat the valves 42 to admit additional steam until such time as the pressures adjust themselves to raise the diaphragm or piston 49 to close the valves 42.

In the form of the invention shown in Figs. 5 and 5A, instead of having a multiple of sets or units of heat transfer or steam consuming devices or cylinders, all controlled by a single valve and control line or means in series or otherwise as in Figs. 1 and 1A, each of the units designated as Sections A, B, C and D are independently controlled by separate valves and control lines instead of merely the last section with lowest pressure and temperature such as Section 4 in Fig. 1A which is so controlled because it is desired to maintain the same at a low temperature at the wet or entering end of the paper web where it is undesirable to expose the same to a high temperature or degree of heat. While not limited to such use, the arrangement shown in Figs. 5 and 5A is especially adapted for soft or tissue papers, particularly because it lends itself to extremely sensitive control and where the heat and steam pressure may be as high or as low as desired with large or small differentials between the different sections. In this form, the construction and arrangement for each section is substantially the same as previously described for a plurality of sections as in Fig. 1 or a single section as in Fig. 1A, although, in this form, low pressure or exhaust steam may also be used. As illustrated, the primary steam line 11 is adapted to be connected to a source of steam supply from a boiler, engine or otherwise, not shown, and communicates with a common header or main 11h running as far as Section D, which is the last section or far end of the system at the lowest temperature and pressure, but the first or entering section for the web at the wet end of the machine. From the header 11h extend branches 11a, 11b, 11c and 11d to the different secondaries 64e through regulating supply or control valves 13e which are of the reducing type as previously described and similarly constructed and controlled. From the secondaries 64e branch pipes 15 extend to the steam consuming units or cylinders 16 which are provided with outlets or drains 17e corresponding to the outlets 17, 17c and 17d previously described. Each of these outlets is provided with an adjustable automatic steam trap or valve 35e adjacent the drain pipe 18e similar to the drain pipes 18, 18a, 18b and 18c. These pipes in Sections A, B and C lead into condensation collecting chambers or condensate tanks 19e which empty through outlets or discharge pipes 21e into a common drain or manifold 71 and have down or upright return pipes 63e like pipes 63 and 63a as in Sections 3 and 4 connected to the control lines 52 and through pipe connections 59 with the control lines 60, the latter extending to the top diaphragm chambers while the pipes 52 extend to the bottom chambers. A thermostatic trap valve 53e is also interposed in each pipe line 63e adjacent the drain or discharge 21e and operates in the same way as the trap valve 53a. Each of the condensate tanks 19e is provided with a temperature and pressure gauge 23e, but there is no discharge from the flash tanks to each succeeding unit with relation to the feed of steam or each preceding unit with relation to the feed of the web as each section receives its individual supply of steam from the header 11h direct through the branches 11a, 11b, 11c and 11d. In Section D, the condensate tank 19a is omitted and the drain manifold 18e is connected by a pipe 67e directly to the drain manifold 71 at 72 shown as a T connection although, generally speaking, I have not desired to be limited to any form of pipe connection, and, for this purpose, have omitted the specific reference to most of the pipe connections throughout the description except where specifically described to bring out a particular function. In this instance, the discharge from the pipe 67e and the drain 71 at the connection 72 leads into a suction or vacuum pump 68e having a discharge 69e to drain, for return to the boiler or to a hot well. The pump 68e is designed to create a suction or vacuum pressure in the drain line to discharge the condensate passing through the trap valves 35e and 53e, the latter of which is connected by a special fitting or elbow like fittings 17a between the pipes 18e and 67e in Section D and has a down or upright return pipe 63e forming part of the control means connected to the pipe 52 and through the connection 59 with the pipe 60 instead of being positioned at the discharge end of a condensate tank 19e as in the previous Sections A, B and C. In this way, any required differential may be established at the far end of the machine to lower the pressure in the down and control lines to clear the machine of condensate. Also, each section and each individual cylinder is independently controlled and adapted to operate at any desired pressure above or below atmospheric pressure with any desired differential between adjoining sections or between the first and last or any of the other sections of the system. Thus, in this case, each section is independently controlled instead of being simultaneously controlled or placed in multiple series with a common supply for steam or with the entire load, but it will also be understood that the near and far ends of the secondary line or any other suitable units or sections thereof may be placed in series by means of the control or by-pass pipe and from different sources, or the same sources, or independently or simultaneously receive its supply of live or exhaust steam or vapor but that, in each instance, the arrangement of the discharge and drain pipes is such as to draw all condensate which would tend to block complete and free circulation of the steam and gases and avoids pockets due to the presence of non-condensable gases, particularly where a suction or vacuum pump is provided at the discharge end. In each cylinder, two pounds or inches differential in pressure is usually sufficient to cause the siphoning and discharge of the water of condensation through the siphon system or pipes thereof and in this way, an effective and uniform heating is maintained according to any desired predetermined differential or set temperature. Also, the control lines being arranged in a continuous loop or circuit, will be readily cleaned out and subject to sensitive control to operate the supply valves leading into the different secondaries and heat or steam consuming units which may take the form of any heat transfer unit such as drying cylinders, radiators or otherwise. Banks of gases, steam or vapor is prevented by the gas equalizing or control lines and the reducing valves may be set to taper the pressure and temperature in the entire set of rolls or cylinders, in addition to controlling and equalizing each individual roll or cylinder and preventing the same from air or gas binding or from creating a vacuum or going to a lower pressure than that for which it is set, due to the rapid condensation of the steam therein. Also, it will be understood that the return or drain from the rolls may be trapped or not as desired, and a steady or fixed differential established to allow a steady flow of steam to each cylinder with exact temperatures provided for and to cause a more even and uniform drying of the paper. The equalizing control lines also vent each roll or cylinder separately allowing non-condensable gases to flow up from each roll or cylinder and pass or be carried off and the condensate flow down from each roll at outlets or drains 17, 17c, 17d and 17e for draining or returning the same to the steam generating system or boiler. The means which I have provided are simple as each cylinder or heat transfer element is provided with a riser and return and the return lines are connected with the pressure or diaphragm chamber on opposite sides of the piston or diaphragm therein by means of the control or by-pass pipes which may be connected to a vacuum pump through the intervention of an automatic trap valve to pass water or moisture but prevent the passage of steam or vapor at a certain temperature for which adjusted, as previously described. By providing a thermostatic trap valve in the line of the vacuum pump of the control or by-pass lines, extremely accurate regulation is insured together with a uniform maintenance of pressure and temperature in the different sections or units, each thermostatic trap valve being set to open at a definite temperature so that the vacuum pump will operate to cause the control lines to exert increased suction on the diaphragm of the reducing valve to admit additional steam as desired. The device also accurately controls the amount of vacuum or pressure in the heating system to admit steam from a primary line through a reducing valve to one or more units individually or simultaneously in series. It will also be seen that fresh, live or exhaust steam may be used in the system controlling certain units, sections or sets of the heat transfer or consuming units of the system whether cylinders, radiators or otherwise. In view of the description of the operation of the form of the invention shown in Figs. 1 and 1A, and the fact that Section 4 is independently controlled even though fed with used or exhaust steam, as well as the fact that each of the units or Sections A, B, C and D of Figs. 5 and 5A is independently controlled from the main steam supply and that each regulating or reducing valve 13e is set at different temperatures and pressures and to open at such adjustment to maintain a desired differential between any and all of the sections, it is thought that the operation of this form of the invention will be readily apparent to any one skilled in the art in view of the foregoing description of operation, and, for this reason, further description thereof is omitted. However, it may be mentioned that installations of the foregoing systems have accomplished an average or mean saving of approximately 20% with complete automatic control and without manual effort or human intervention, especially due to the fact that slight unbalancing of the pressure or temperature away from an established differential for which the device is set will, through the control pipes and the lack of expansion prevented by the system, result in immediate opening of the supply valves with greatly improved operation and increase in efficiency of the heating or product produced therefrom.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention what I claim as new and desire to secure by Letters Patent is:

1. In a heat transfer system having a primary steam supply line and a secondary steam line connected to the primary line with a near end and a far end and a return therefor, heat transfer units having inlets connected to the secondary line and return, a regulating valve interposed between said primary and secondary lines and controlling the admission of steam from the former to the latter, and pressure actuated control means for said regulating valve, said control means including a pressure chamber shut off from the atmosphere, a member movable therein connected to the valve and exposed to the steam pressure on both sides thereof, and separate control pipes connected to the chamber at opposite sides of the member, one pipe being connected to the near end of the secondary, to the outlets of the units and return and the other pipe being connected to the far end of the first control pipe.

2. In a heat transfer system having heat transfer units, a primary steam supply line and a secondary steam line receiving steam from the primary line and connected to the units for distributing steam to the latter, with a near end and a far end and a return, a regulating valve interposed between said primary and secondary lines controlling the admission of steam from the former to the latter, pressure actuated control means for said regulating valve, said control means including a pressure chamber, a member movable therein and exposed to pressure on both sides thereof, a separate control pipe connected to the chamber at opposite sides of the member, one pipe being connected to the near end of the secondary, discharge ends of the units and return and the other pipe being connected to the first pipe adjacent the far end thereof and means for creating a suction in said pipes.

3. In a heat transfer system having a heat transfer element, a primary steam supply line and a secondary steam line connected to the primary line, a regulating valve interposed between said primary and secondary lines, pressure actuated control means for said regulating valve, a connection between said secondary line and the element for supplying steam thereto, a return from said element, said pressure actuated control means for said regulating valve including a pressure chamber, a movable member therein operatively connected to the valve, a control pipe connected to the chamber at one side of the member, to the secondary and return of the element and another control pipe connected to the chamber at the other side of the member and to the remote end of the first pipe.

4. In a heat transfer system having a heat transfer element, a primary steam supply line and a secondary steam distributing line connected to the primary line and element, a regulating valve interposed between said primary and secondary lines, pressure actuated control means for said regulating valve, a connection between said secondary line and the element for supplying steam thereto, a return for said element, said pressure actuated control means for said regulating valve including a pressure chamber, a movable member therein operatively connected to the valve, a control pipe connected to the chamber at one side of the member, to the secondary and return and another control pipe connected to the chamber at the other side of the member and to the remote end of the first pipe, suction creating means connected to the return and the remote end of the first pipe and a thermostatic trap valve in the return.

5. In a heat transfer system having a primary steam supply line and a secondary steam line connected to the primary line, one or more heat transfer units, a regulating valve interposed between said primary and secondary lines for supplying steam to the latter, a connection between the secondary and each transfer unit, a discharge pipe connected to each transfer unit, a condensate return pipe connection to the discharge pipes, and pressure actuated control means for actuating said regulating valve and having control pipes, a pressure chamber, a diaphragm therein connected to the valve to actuate the same, said pipes being connected at one end of each to the chamber on opposite sides of the diaphragm, one pipe being connected at its other end to the secondary between the valve and the heat transfer units and at its opposite end to the discharge pipes and return pipe connection, and the other pipe being connected at its other end to the first pipe and to the return pipe connection.

6. In a heat transfer system, a plurality of heat transfer elements, a primary steam supply line and a secondary steam line connected to the primary line, a regulating valve controlling the supply of steam from the primary steam line to the secondary steam line, supplying connections between the secondary and the elements, return discharge connections for said elements having a drain and pressure actuated control means for actuating said regulating valve including a pressure chamber, a diaphragm therein connected to the valve, a small control pipe connected to the chamber on one side of the diaphragm, to the near end of the secondary in front of the elements and discharge connection for each element and another pipe connected to the chamber at the other side of the diaphragm and to the first pipe at the remote end thereof, and the return pipe connected to the discharge connections and to the first control pipe beyond the connection thereof with the secondary line and elements.

7. In a heat transfer system, a plurality of heat transfer elements, a primary steam supply line therefor and a secondary steam line connected to the primary line, a return pipe for said elements, a regulating valve controlling the supply of steam from the primary steam line to the secondary steam line, supplying connections between the secondary and the elements, return discharge connections from said elements having a drain and a pressure actuated control means for said regulating valve including a pressure chamber, a diaphragm therein connected to the valve, a small control pipe connected to the chamber on one side of the diaphragm, to the near end of the secondary and discharge connections for each element and another small control pipe connected to the chamber at the other side of the diaphragm and to the first control pipe at the remote end thereof and return pipe, and a thermostatic trap valve interposed in the discharge return and between the latter and the first control pipe.

8. In a heat transfer system having a plurality of heat transfer units, a steam supply pipe for said units and a return pipe therefor, a control valve in said supply pipe and controlling the admission of steam to the units, a pressure actuated device connected to said valve and including a closed chamber with a movable member therein, means for regulating said member and valve, a control pipe connected to the chamber at one side of the member and to the supply pipe between the valve and the units, a discharge pipe connected to each unit and said control pipe, and another control pipe connected to the chamber at the other side of the member and connected to the first control pipe near the discharge end thereof.

9. In a heat transfer system of the class described having a plurality of heat transfer units, a primary steam supply pipe therefor, a secondary pipe receiving steam from the supply pipe, a valve interposed between supply pipe and secondary pipe controlling the supply of steam from the former to the latter, a chamber closed off from the atmosphere, a diaphragm therein connected to the valve and forming closed chambers on opposite sides thereof, a small control pipe leading from a closed chamber at one side of the diaphragm and having a connection to the secondary pipe adjacent the near end thereof and to the several units at the discharge ends thereof, connections between the secondary and the units for supplying steam to the latter, a drain pipe connected to the discharge end of each unit, a return pipe connected to the drain pipe and to the far end of the first control pipe, and another pipe connected to the other closed chamber at the opposite side of the diaphragm and to the first control pipe at the far end thereof.

10. In a heat transfer system, a plurality of heat transfer units, a steam supply pipe therefor and a return pipe therefor, a control valve in said supply pipe and having a pressure actuated means for admitting steam to the units and including a pressure chamber with a movable member operatively connected to the valve for actuating the latter, means for regulating the value, a discharge pipe for each unit, a return pipe connected to the discharge pipes with one or more interposed trap valves, a control pipe connected to the pressure chamber on one side of the member, to the supply pipe between the valve and the units, to each unit at its discharge end and to the return pipe, and another pipe connected to the pressure chamber at the other side of the member and to the return pipe, and suction creating means connected to the discharge and return pipes, said units being connected in series.

11. In a heat transfer system, a plurality of heat transfer units, a steam supply pipe connected to the units for supplying steam thereto, a control valve in said supply pipe and having a pressure actuated means for admitting steam to the units and including a pressure chamber with a movable element operatively connected to the valve and means for regulating the same, a discharge pipe for each unit, a return pipe connected to the discharge pipes with an interposed trap valve, a control pipe connected to the chamber on one side of the element, to the supply pipe between the valve and the unit, to each unit at its discharge end and to the return pipe, and another pipe connected to the chamber at the other side of the element and to the return pipe, and suction creating means connected to the discharge and return pipes, said units being arranged in a plurality of series each connected with the supply pipe through an independent control valve provided with a similar control means.

12. In a heat transfer system having a heat transfer unit, a primary steam supply pipe, a secondary pipe connected to the supply pipe, a control valve between the supply pipe and the secondary pipe, a steam return pipe, said heat transfer unit comprising a cylinder having an inlet connected to the secondary pipe and a discharge pipe connected axially thereto, said discharge pipe having a syphon drain pipe extending down into the cylinder in divergent relation to the peripheral wall thereof and having an end portion spaced from said wall and following the curvature thereof, a drain pipe connected to the discharge pipe, pressure actuated control means for the valve adapted to be adjusted to establish a predetermined differential between the supply and secondary pipes and unit, a diaphragm chamber closed off from the atmosphere, a diaphragm therein operatively connected to the valve, a small control pipe connected to the chamber below the diaphragm, to the secondary pipe between the valve and the unit and to the discharge pipe of the latter, said steam return pipe being connected to the far end of the first control pipe and the drain and another control pipe connected to the chamber above the diaphragm and to the return pipe.

SAMUEL P. MILLER.